(12) United States Patent
Oi

(10) Patent No.: US 7,147,238 B2
(45) Date of Patent: Dec. 12, 2006

(54) BICYCLE PART WITH A PARTITIONED CHAMBER

(75) Inventor: Takeshi Oi, Sakai (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/710,747

(22) Filed: Jul. 30, 2004

(65) Prior Publication Data

US 2005/0029772 A1 Feb. 10, 2005

(30) Foreign Application Priority Data

Aug. 5, 2003 (JP) ............................. 2003-286961

(51) Int. Cl.
 *B62K 3/02* (2006.01)
 *B62K 3/14* (2006.01)
(52) U.S. Cl. ............................... 280/281.1; 280/288.2; 280/288.3
(58) Field of Classification Search ............. 280/281.1, 280/288.2, 288.3
 See application file for complete search history.

(56) References Cited

U.S. PATENT DOCUMENTS

| | | | | |
|---|---|---|---|---|
| 908,127 | A * | 12/1908 | Passmore | ..................... 138/116 |
| 4,678,054 | A | 7/1987 | Honda et al. | |
| 4,900,048 | A * | 2/1990 | Derujinsky | ............... 280/281.1 |
| 5,221,102 | A * | 6/1993 | Spangler | ................... 280/281.1 |
| 5,255,932 | A * | 10/1993 | Moore | ...................... 280/281.1 |
| 5,478,100 | A * | 12/1995 | McDermitt et al. | ...... 280/281.1 |
| 6,695,335 | B1 | 2/2004 | Gaastra | |
| 6,848,700 | B1 * | 2/2005 | Fritschen | ................. 280/281.1 |
| 2004/0188976 | A1 | 9/2004 | Schmider | .................... 280/279 |

FOREIGN PATENT DOCUMENTS

| | | |
|---|---|---|
| DE | 19712326 A1 | 10/1998 |
| GB | 2224253 A * | 5/1990 |
| JP | 2000-264280 A | 9/2000 |
| JP | 2000-302074 A | 10/2000 |
| JP | 2003-011879 A | 1/2003 |
| WO | 9941138 A1 | 8/1999 |

OTHER PUBLICATIONS

EP Search Report for EP 04018275.0, the European patent application which corresponds to this application, dated Jan. 18, 2006.

* cited by examiner

*Primary Examiner*—Lesley D. Morris
*Assistant Examiner*—Marlon Arce-Diaz
(74) *Attorney, Agent, or Firm*—James A. Deland

(57) ABSTRACT

A bicycle part comprises a tubular bicycle member elongated in a first direction and having a partition forming an interior partitioned chamber that is elongated in the first direction. The bicycle member does not form an opening extending along the entire length of the partitioned chamber that exposes the partitioned chamber, but does include an insertion opening for inserting an elongated member into the partitioned chamber.

18 Claims, 10 Drawing Sheets

Fig. 11
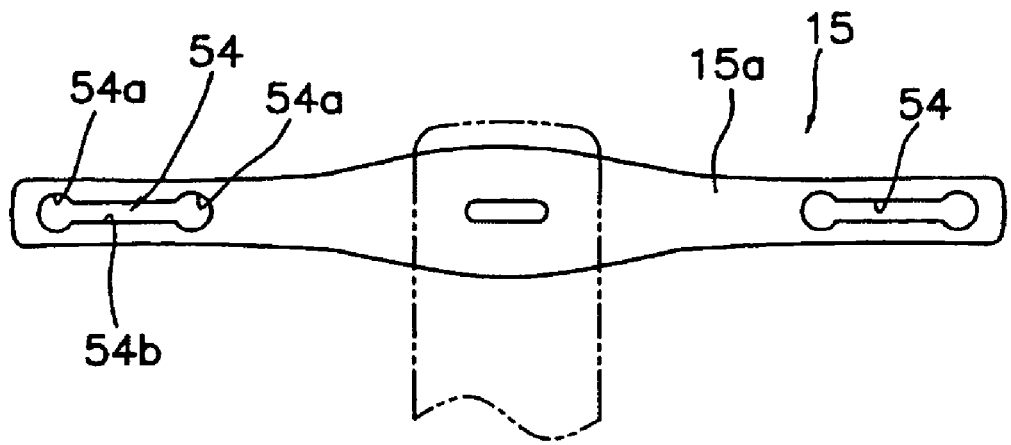
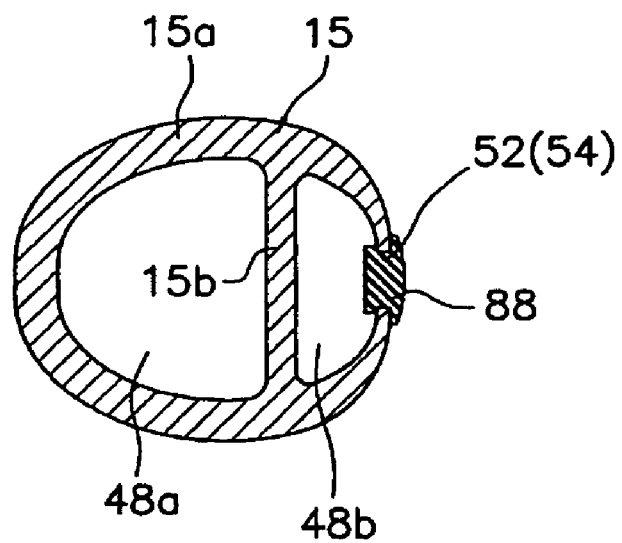
Fig. 12

BICYCLE PART WITH A PARTITIONED CHAMBER

BACKGROUND OF THE INVENTION

The present invention is directed to bicycles and, more particularly, to a bicycle part with a partitioned chamber adapted to house a protected member.

Hollow pipes are frequently used to make various bicycle components, such as bicycle frames. Sometimes such frames are configured to house electrical wiring and mechanical cabling used to operate various bicycle components such as brake and transmission components. An example of such a frame is shown in JP 2000-302074. In some bicycles, mechanical operating cables may be routed along the various bicycle frame and frame-mounted components from brake levers located on the handle bar to front and rear brakes, and from one or more shift control devices located on the handlebar to front and/or rear bicycle transmissions. Likewise, electrical connecting cords may be routed along the various bicycle frame and frame-mounted components from a motor and/or headlight located at the front of the bicycle frame to a battery and/or electrical controller located in the center of the bicycle frame.

In the system shown in JP 2000-302074, cable retainers in the form of recesses for the insertion of wiring, such as the mechanical and electrical cabling noted above, are formed integrally with the frame pipe on the outer peripheral surface of the frame pipe and extend along the full length of the frame pipe. After the wiring is inserted into the recesses, caps are used to close off the recesses to protect the wiring from damage and corrosion. Unfortunately, since the recesses extend along the entire length of the frame pipe, the strength of the frame pipe is reduced. In order to preserve the strength of the frame pipe, it is necessary to increase the cross sectional area of the frame. However, doing so increases the weight of the frame, which is very undesirable in bicycles.

SUMMARY OF THE INVENTION

The present invention is directed to various features of a bicycle part that may be used to accommodate wiring such as mechanical cables, electrical connecting cords, etc. In one embodiment, a bicycle part comprises a tubular bicycle member elongated in a first direction and having a partition forming an interior partitioned chamber that is elongated in the first direction. The bicycle member does not form an opening extending along the entire length of the partitioned chamber that exposes the partitioned chamber, but does include an insertion opening for inserting an elongated member into the partitioned chamber.

Additional inventive features will become apparent from the description below, and such features alone or in combination with the above features may form the basis of further inventions as recited in the claims and their equivalents.

BRIEF DESCRIPTION OF THE DRAWINGS

FIG. 11 is a rear view of another embodiment of a handlebar; and

FIG. 12 is a cross sectional view of another embodiment of a handlebar.

DETAILED DESCRIPTION OF THE EMBODIMENTS

Figure 1:
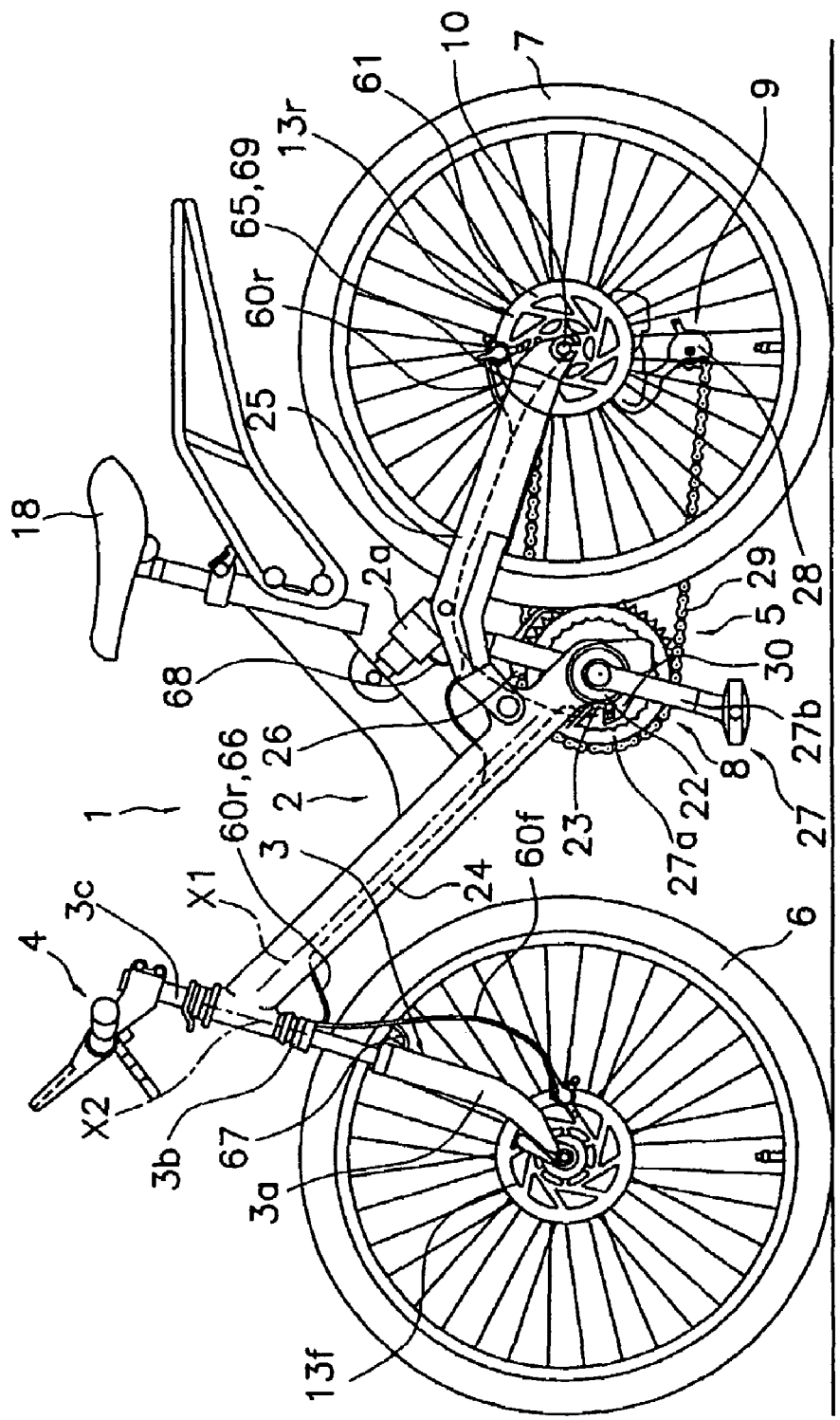
FIG. 1 is a side view of a particular embodiment of a bicycle.

FIG. 1 is a side view of a bicycle including provisions for housing mechanical and/or electrical wiring or some other elongated component. In this embodiment, the bicycle is a mountain bicycle comprising a frame 1 having a tubular frame body 2; a front fork 3 rotatably mounted to the front of frame body 2; a front wheel 6 with a front disk brake device 13f rotatably mounted to front fork 3; a handlebar assembly 4 mounted to the upper portion of front fork 3; a rear wheel 7 with a rear disk brake device 13r rotatably mounted to a hub dynamo 10 at the rear portion of frame body 2, a driving portion 5 comprising front and rear gear-shift mechanisms 8 and 9; and a controller 11 (FIG. 6) for controlling various electrical components including the front and rear gear-shift mechanisms 8 and 9.

The frame body 2 of the frame 1 comprises a Y-shaped main frame 24 and a swing arm 25 pivotably mounted to the back of main frame 24. Main frame 24 and swing arm 25 may be made by welding pipe having a generally rectangular shape formed by extrusion of aluminum alloy, for example. A rear suspension 2a is mounted between main frame 24 and swing arm 25, and a saddle 18 is mounted to the rear of main frame 24. Swing arm 25 bifurcates from the pivot point and extends to the center of rear wheel 7 so as to straddle rear wheel 7.

Front fork 3 comprises left and right suspension components 3a, an arch 3b linking the tops of suspension components 3a in a conventional manner, and a rotating support 3c extending from the center of the arch 3b up through the head tube of main frame 24. Rotating support 3c is a pipe-shaped member that rotates around a rearwardly inclined pivot axis X2.

Figure 3:
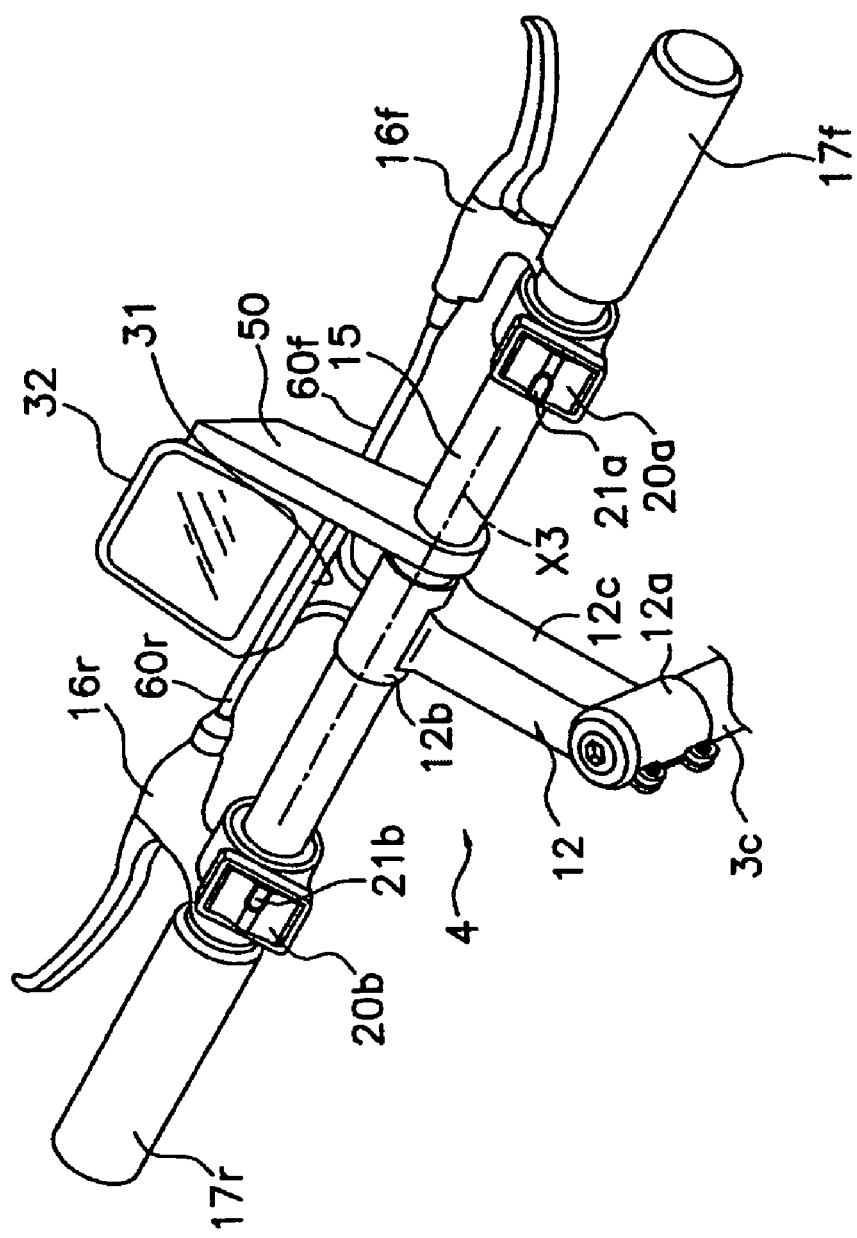
FIG. 3 is an enlarged oblique view of the bicycle handlebar assembly.

As shown in FIG. 3, handlebar assembly 4 comprises a handle stem 12 and a handlebar 15, wherein handle stem 12 is fastened to the upper portion of the front fork 3, and handlebar 15 is fastened to handle stem 12. Handle stem 12 comprises a fork fixing component 12a screwed to the rotating support 3c, a handle bar mounting component 12b for mounting handlebar 15, and a stem 12c having a generally rectangular cross-sectional shape for joining the two. Handlebar 15 is a generally circular tubular member that may be formed by extruding an aluminum alloy, for example.

Brake levers 16f and 16r and grips 17f and 17r are mounted at opposite ends of the handlebar 15. Brake levers 16f and 16r are operatively coupled to the front and rear disk brake devices 13f and 13r through respective brake cable assemblies 60f and 60r. Gear-shift switches 20a and 20b disposed in the mounting brackets for brake levers 16f and 16r are provided for carrying out manual gear-shift operations of the front and rear gear-shift mechanisms 8 and 9. An operating switch 21a is provided for switching between an automatic mode and a manual mode of operation, and an operating switch 21b is provided for manually adjusting the stiffness of the front and rear suspensions 3a and 2a.

Front gear-shift mechanism 8 comprises a crank arm assembly 27 including a right side crank arm 27a and a left side crank arm 27b mounted to a crankshaft (not shown) that is rotatably mounted within a bottom bracket portion of frame body 2. A plurality of front sprockets (e.g., three sprockets) are mounted to crank arm 27a, and an electrically operated front derailleur 26 is mounted to frame body 2 in close proximity to crank arm 27a for switching a chain 29 among the plurality of front sprockets. Rear gear-shift mechanism 9 comprises a plurality of rear sprockets (e.g., nine sprockets) and an electrically operated rear derailleur 28 that is mounted to the rear of frame body 2 for switching chain 29 among the plurality of rear sprockets 27.

The hub dynamo 10 mounted to rear wheel 7 is adapted to mount a brake disc 61 and a freewheel to which the plurality of rear sprockets is mounted. An alternating current generator 19 (FIG. 6) is mounted inside the hub for generating power according to the rotation of the rear wheel 7.

A rotation detector 22 operates in conjunction with left crank arm 27b for detecting the rotation of crank arm assembly 27. Rotation detector 22 comprises a reed switch 23 (FIG. 6) mounted to frame body 2 and a plurality of (e.g., four) magnets mounted to left crank arm 27b and circumferentially spaced evenly with respect to the rotational axis of crank arm assembly 27. As a result, reed switch 23 outputs four pulses for each revolution of crank arm assembly 27. In this embodiment, rotation detector 22 is used to control the operation of front and rear gear-shift mechanisms 8 and 9, since it is preferable that the gear-shift mechanisms be operated only when the crank arm assembly 27 is rotating.

Controller 11 manually controls front and rear gear-shift mechanisms 8 and 9 and front and rear suspensions 3a and 2a in response to the operation of the gear-shift switches 20a and 20b and operating switches 21a and 21b. Controller 11 also may automatically control front and rear gear-shift mechanisms 8 and 9 and front and rear suspensions 3a and 2a in response to the speed of the bicycle.

Figure 6:
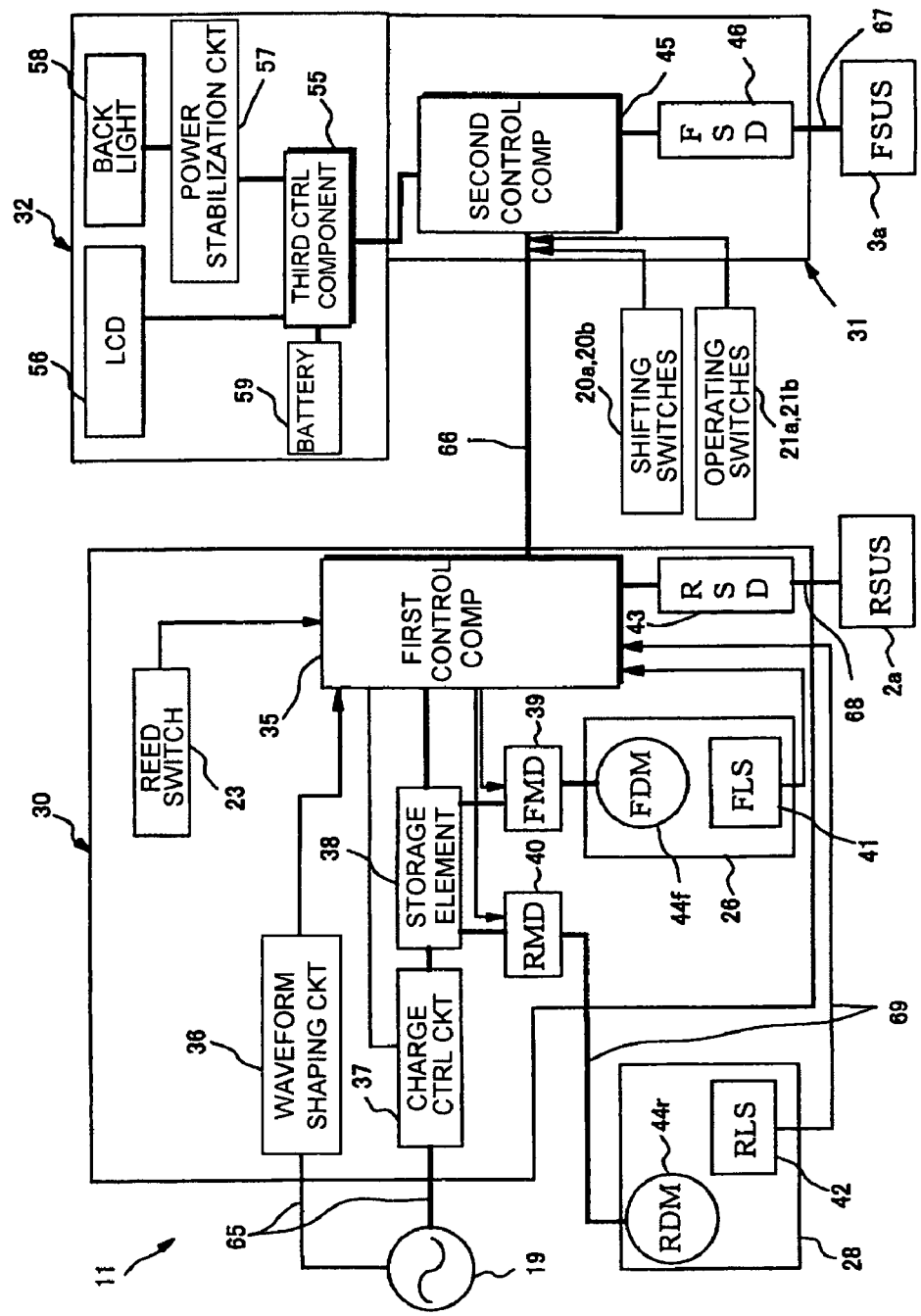
FIG. 6 is a block diagram of a particular embodiment of a control circuit that controls a plurality of bicycle components.

As shown in FIG. 6, controller 11 has a first control unit 30, a second control unit 31, and a third control unit 32. First control unit 30 may be mounted at the bottom bracket portion of frame body 2 in close proximity to rotation detector 22 and front derailleur 26. First control unit 30 is connected to and is powered by alternating current generator 19 through an electrical connecting cord 65. First control unit 30 powers and controls the front derailleur 26 through internal wiring, it powers and controls the rear derailleur 28 through an electrical connecting cord 69, and it powers and controls rear suspension 2a through an electrical connecting cord 68. Since first control unit 30 is provided close to the alternating current generator 19, a shorter connecting cord 65 may be used, thus increasing the efficiency of power and data signal communication.

First control unit 30 includes a first control component 35 in the form of a microcomputer, reed switch 23, a waveform-shaping circuit 36 for generating a speed signal derived from the output of the alternating current generator 19, a charge control circuit 37, a power storage element 38, a front derailleur motor driver (FMD) 39, a rear derailleur motor driver (RMD) 40, a front derailleur operating position sensor (FLS) 41, a rear derailleur operating position sensor (RLS) 42, and a rear suspension motor driver (RSD) 43. Charge control circuit 37 rectifies the power output from alternating current generator 19 and produces direct current power. Power storage element 38 may comprise a large-capacity capacitor, for example, for storing the direct current power produced by charge control circuit 37. If desired, power storage element 38 may comprise a secondary storage battery such as a nickel cadmium battery, lithium ion battery, nickel hydride battery, etc. instead of a capacitor. The power stored in power storage element 38 is communicated to the first control component 35 and to the motor drivers 39, 40 and 43. The motor drivers 39, 40 and 43 output driving signals for driving motors 44f and 44r used to control derailleurs 26 and 28 and a motor (not shown in the figure) used to control the rear suspension 2a in accordance with control signals from first control component 35. First control portion also communicates power and control signals to second control unit 31 and third control unit 32 through an electrical connecting cord 66.

First control unit 30 controls the gear shift devices 8 and 9 and the rear suspension 13 in accordance with the riding mode. More specifically, in automatic mode, the first control unit 30 performs gear shift control of the gear shift devices 8 and 9 in response to the bicycle speed and adjusts the stiffness of the rear suspension 2a in response to the bicycle speed. In manual mode, the gear shift devices 8 and 9 and the rear suspension 2a are controlled in response to the operation of the gear shift switches 20a and 20b and the operation switches 21a and 21b.

Figure 7:
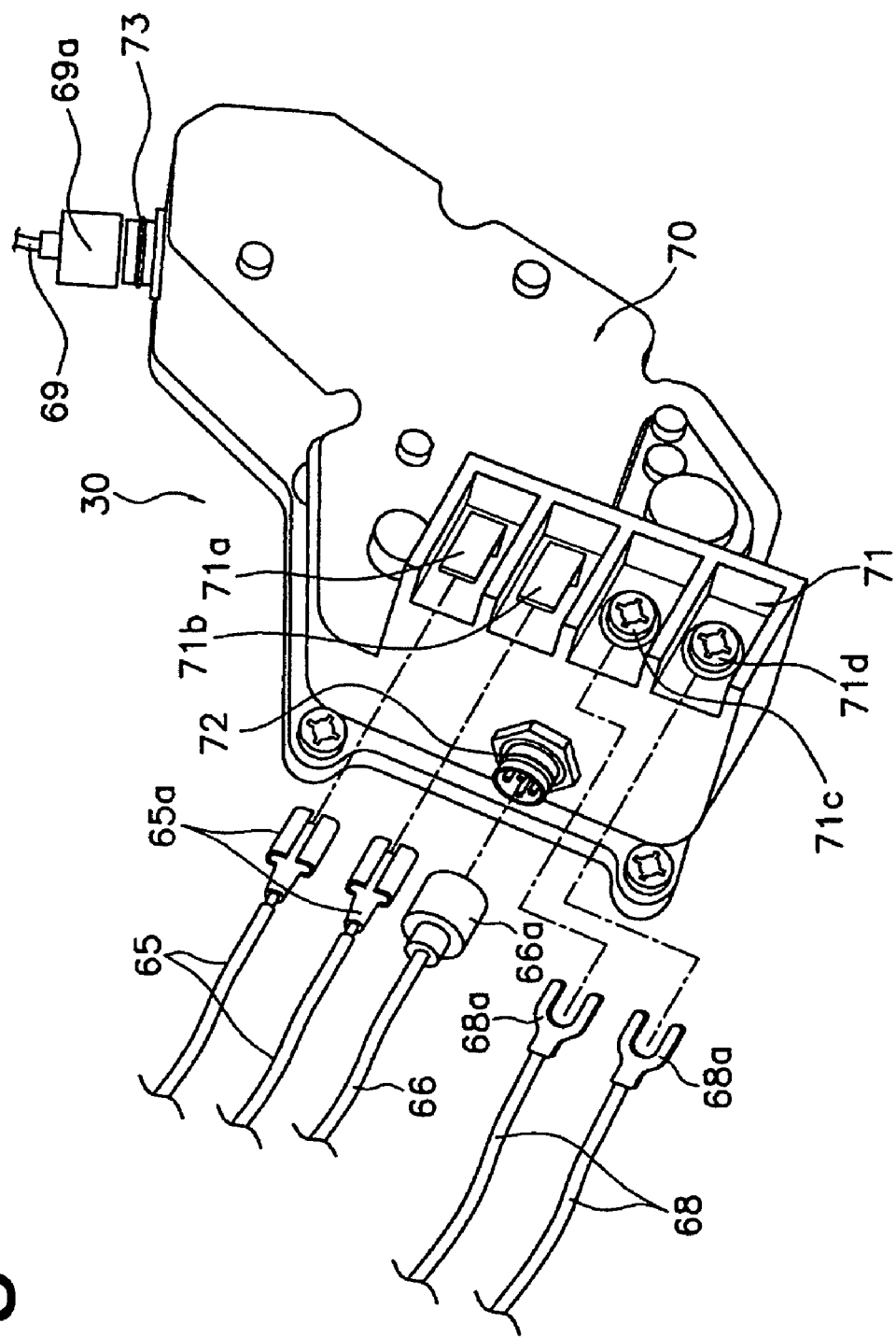
FIG. 7 is an external perspective view of a first control unit.

As shown in FIG. 7, first control unit 30 has a case 70 that houses the various electrical components discussed above. Case 70 includes a terminal board 71 used for mounting the connecting cords 65 and 68 and two chassis plugs 72 and 73 used for mounting the connecting cords 66 and 69. A chassis socket 66a having a plurality of (e.g., four) female terminals mounted to one end of connecting cord 66 is connected to chassis plug 72, which has a corresponding plurality of male terminals or pins, and the other end of connecting cord 66 is connected to second control unit 31. A chassis socket 69a mounted to one end of connecting cord 69 is connected to chassis plug 73, and the other end of connecting cord 69 is connected to rear derailleur 28.

A pair of plate-shaped male FASTON terminals 71a and 71b and a pair of screw terminals 71c and 71d are disposed on the terminal board 71. A pair of female FASTON terminals 65a that are crimped onto one end of connecting cord 65 are connected to the male FASTON terminals 71a and 71b, and the alternator 19 is connected to the other end of connecting cord 65. A pair of Y-terminals 68a and 68b that are crimped to one end of connecting cord 68 are connected to the screw terminals 71c and 71d, respectively, and the rear suspension 2a is connected to the other end of connecting cord 68. Because the terminal configurations of the connecting cord 65 connected to the alternator 19 and the connecting cord 68 connected to the rear suspension 2a are different, the connecting cords 65 and 68 cannot be mistakenly connected in place of each other. As a result, damage to the various circuits inside the first control unit 30, which could easily take place if a mistaken connection were to occur, can be prevented.

As noted above, first control unit 30 also supplies power and control signals to second control unit 31 and third control unit 32 through an electrical connection cord 66 . More specifically, the first control unit 30 provides composite power/control signals in a pulse code modulated format.

The control signals may include the speed signals from waveform-shaping circuit 36. The second control unit 31 and third control unit 32 derive power from the power signal components of the composite signals and are controlled according to the control signal components of the composite signals.

Second control unit 31 is mounted via a bracket 50 (FIGS. 3, 8 and 9) to the handlebar 15 of the handlebar assembly 4. Second control unit 31 comprises gear-shift switches 20a and 20b, operating switches 21a and 21b, a second control component 45 in the form of a microcomputer, and a front suspension motor driver (FSD) 46. Second control unit 31 transfers the operating data of switches 20a, 20b, 21a and 21b to first control unit 30. In automatic mode, second control component 45 adjusts the stiffness of front suspension 3a through an electrical connecting cord 67 in accordance with a control signal sent from first control unit 30 based on bicycle speed. In manual mode, second control component 45 adjusts the stiffness of front suspension 3a in accordance with the operation of operating switch 21b.

Figure 8:
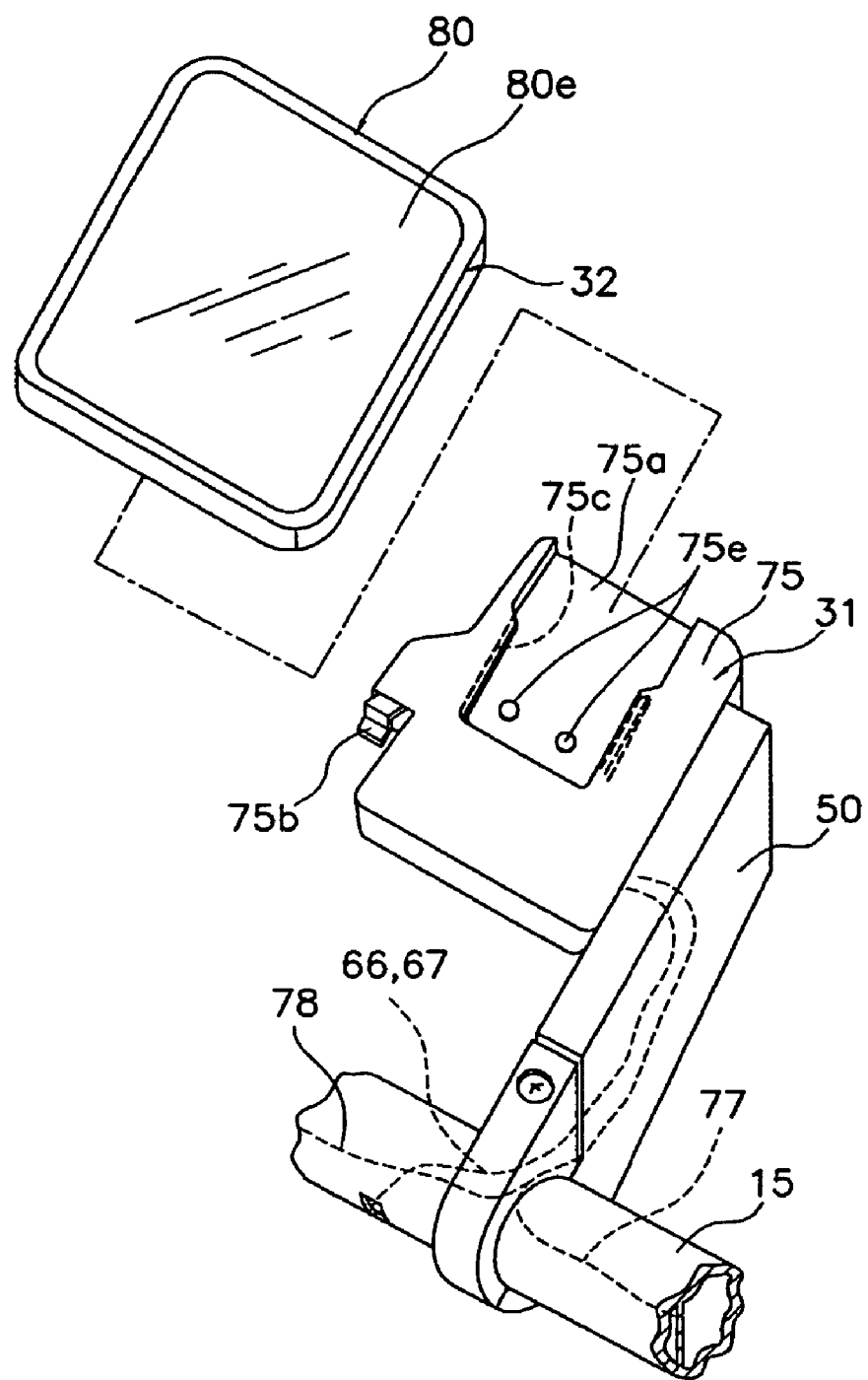
FIG. 8 is a perspective view showing front surfaces of second and third control units.
Figure 9:
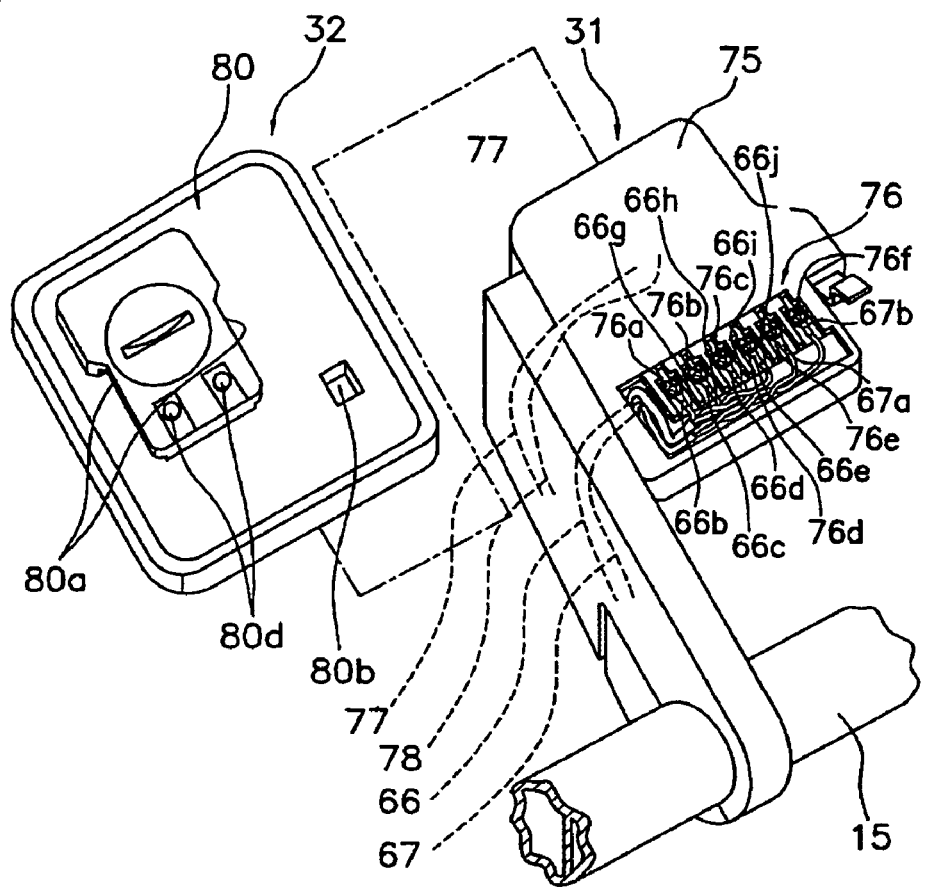
FIG. 9 is a perspective view showing rear surfaces of the second and third control units.

As shown in FIGS. 8 and 9, second control unit 31 has a case 75 that houses the various electrical components described above. A terminal board 76 used for mounting the connecting cords 66 and 67 is disposed on the back surface of the case 75, and six screw terminals 76a–76f are disposed on the terminal board 76.

Connecting cord 66 is a four-wire cord comprising four core wires 66g–66j. Of these core wires, the core wire 66g may be a ground wire for the other three wires. The core wire 66h may be used to supply electric power and control signals (e.g., bicycle speed signals) to the second control unit 31. The core wire 66i may provide signals from the gear shift switches 20a and 20b and the operation switches 21a and 21b, for example, to the first control unit 30. In this embodiment, the current flowing through core wire 66i is an analog current having a different voltage for each switch by using a voltage divider. The core wire 66j may be used to supply electric power that drives the front suspension 3a.

As noted above, a chassis socket 66a is mounted to one end of connecting cord 66. Four Y-terminals 66b–66e that are connected to the screw terminals 76a–76d are crimped onto the four core wires 66g–66j at other end of connecting cord 66. These Y-terminals 66b–66e are respectively crimped onto the four core wires 66g–66j after connecting cord 66 has been sized and cut in accordance with the bicycle model configuration and/or the size of the frame body 2.

Two Y-terminals 67a and 67b that are connected to screw terminals 76e and 76f are crimped onto one end of connecting cord 67, and the other end of connecting cord 67 is connected to front suspension 3a. Connecting cords 77 and 78 extend from the case 75, wherein connecting cord 77 is connected to gear shift switch 20a and to operation switch 21a, and connecting cord 78 is connected to gear shift switch 20b and to operation switch 21b. These cords 77 and 78 terminate at the screw terminals 76c and 76d.

As shown in FIG. 8, a guiding cavity 75a having a pair of notches 75c is formed on the front surface of case 75. A locking piece 75b also is formed on the front surface of case 75. Protrusions 80a (FIG. 9) disposed on the back of a case 80 that houses the electrical components of the third control unit 32 slidingly and detachably engage the notches 75c, and a concavity 80b disposed on the back of case 80 of third control unit 32 engages with the locking piece 75b. Locking piece 75b possesses a degree of pliability that enables it to detachably engage concavity 80b. Finally, a pair of contact points 75e formed on the front surface of case 75 electrically contact a corresponding pair of contact points 80d formed on the back of case 80 of third control unit 32.

Third control unit 32 is a so-called cycle computer, and it is detachably mounted to second control unit 31 as noted above. A battery 59 (e.g., a button battery) is mounted to third control unit 32 so that third control unit 32 can operate even if it is detached from second control unit 32. Consequently, various initial settings such as the wheel diameter setting may be performed, and various data such as the distance ridden and the time ridden can be stored therein. Third control unit 32 has a third control component 55 in the form of a microcomputer, a liquid crystal display (LCD) unit 56, and a backlight 58. Backlight 58 is coupled to third control component 55 through a power stabilizion circuit 57. These electrical components are housed within case 80. The LCD unit 56 is capable of displaying various data such as speed, cadence, travel distance, gear-shift location, suspension status and so forth through a display window 80e disposed on the front of case 80 in response to control signals received from first control unit 30, and it is illuminated by backlight 58. Power stabilization circuit 57 stabilizes the power by smoothing the power derived from the composite power/control signals. Consequently, even when intermittent control signals are sent together with the power signals, there is little flickering in the backlight 58. The third control unit 32 also may function as a pedometer if it is detached from the second control unit 31.

In operation, alternating current generator 19 of dynamo hub 10 generates electric power when the bicycle is traveling, and the electric power is communicated to first control unit 30 through electrical connection cord 65 and stored in power storage element 38. Since the generator 19 is provided on the rear wheel 7, the power storage element 38 also may be charged by putting the bicycle on its stand and rotating the pedals if the charge produced by normal travel is insufficient. This is particularly helpful when adjusting the gear-shift mechanisms and setting the operations of the LCD unit 56.

When the bicycle speed either exceeds a predetermined threshold value or falls below a predetermined threshold value in automatic mode, a gear-shift operation is carried out. In this embodiment, the gear-shift operation is carried out with priority given to the rear derailleur 28. When the speed exceeds a predetermined threshold value, the stiffness of both suspensions 3a and 2a also may be made stiffer. In the meantime, various operating parameters are displayed on LCD unit 56 with the help of backlight 58.

Because power signals and control signals are provided in the form of a composite signal, a single line may be used to communicate both signals. Also, since the control apparatus is divided into three separate units, the number and length of lines can be reduced, thus efficiently communicating power and control signals. Furthermore, because the Y-terminals and FASTON terminals can be crimped on the ends of the connecting cords after the lengths of the connecting cords is determined, the control units 30 and 31 can be placed freely on the bicycle.

A bicycle constructed according to the teachings herein has many features to accommodate wiring such as brake cable assemblies 60f and 60r and electrical connecting cords 66–69. These features shall now be described.

Figure 2A:
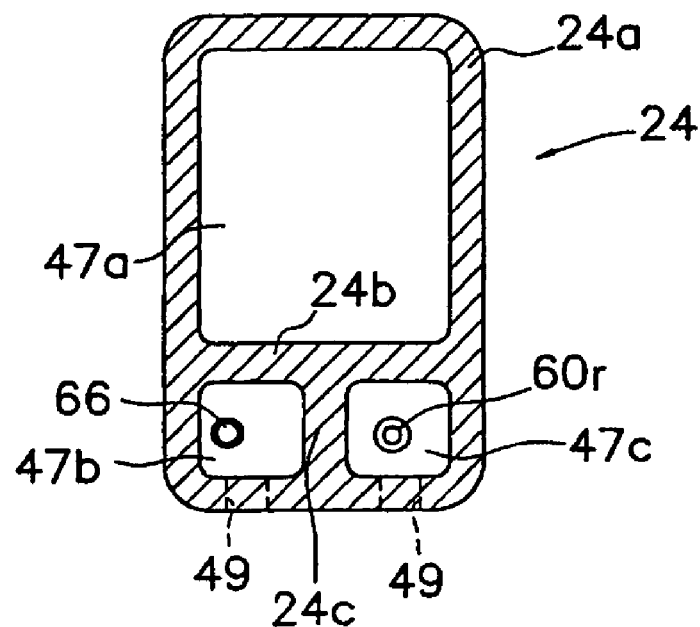
FIG. 2A is a cross sectional view of the main frame.
Figure 2B:
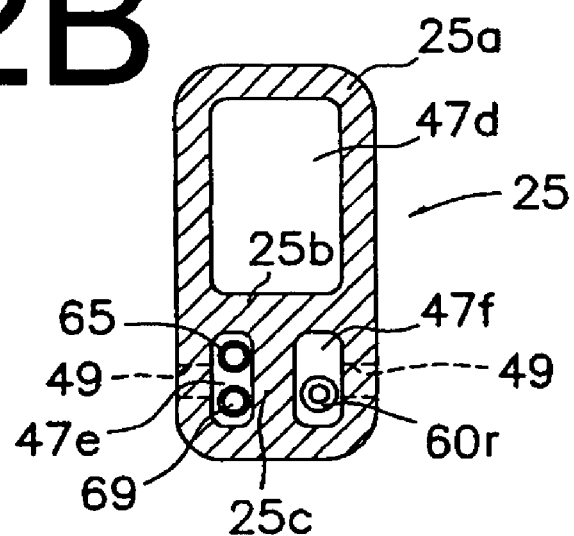
FIG. 2B is a cross sectional view of a swing arm portion of the frame.

FIG. 2A is a cross sectional view of main frame 24, and FIG. 2B is a cross sectional view of swing arm 25. As shown in FIG. 2A, main frame 24 comprises a tubular frame main body 24a having a generally rectangular cross section. A horizontal partition 24b and a vertical partition 24c extend along a longitudinal axis X1 (FIG. 1) of main frame 24 so that the total space in frame main body 24a is divided into chambers 47a, 47b and 47c. In this embodiment, chamber 47a is empty, connecting cord 66 extends along and is housed by chamber 47b, and brake cable assembly 60r extends along and is housed by chamber 47c. A wire insertion component in the form of a wire insertion opening 49 that allows connecting cord 66 to be inserted into and removed from chamber 47b is formed in frame main body 24a, and a similar wire insertion opening 49 that allows brake cable assembly 60r be inserted into and removed from chamber 47c also is formed in frame main body 24a.

As shown in FIG. 2B, swing arm 25 comprises a tubular swing arm body 25a having a generally rectangular cross section. A horizontal partition 25b and a vertical partition 25c extend longitudinally along swing arm 25 so that the total space in swing arm body 25a is divided into chambers 47d, 47e and 47f. In this embodiment, chamber 47d is empty, connecting cords 65 and 69 extend along and are housed by chamber 47e, and brake cable assembly 60r extends along and is housed by chamber 47f. A wire insertion opening 49 that allows connecting cords 65 and 68 to be inserted into and removed from chamber 47e is formed in swing arm body 25a, and a similar wire insertion opening 49 that allows brake cable assembly 60r be inserted into and removed from chamber 47f also is formed in swing arm body 25a.

Figure 4:
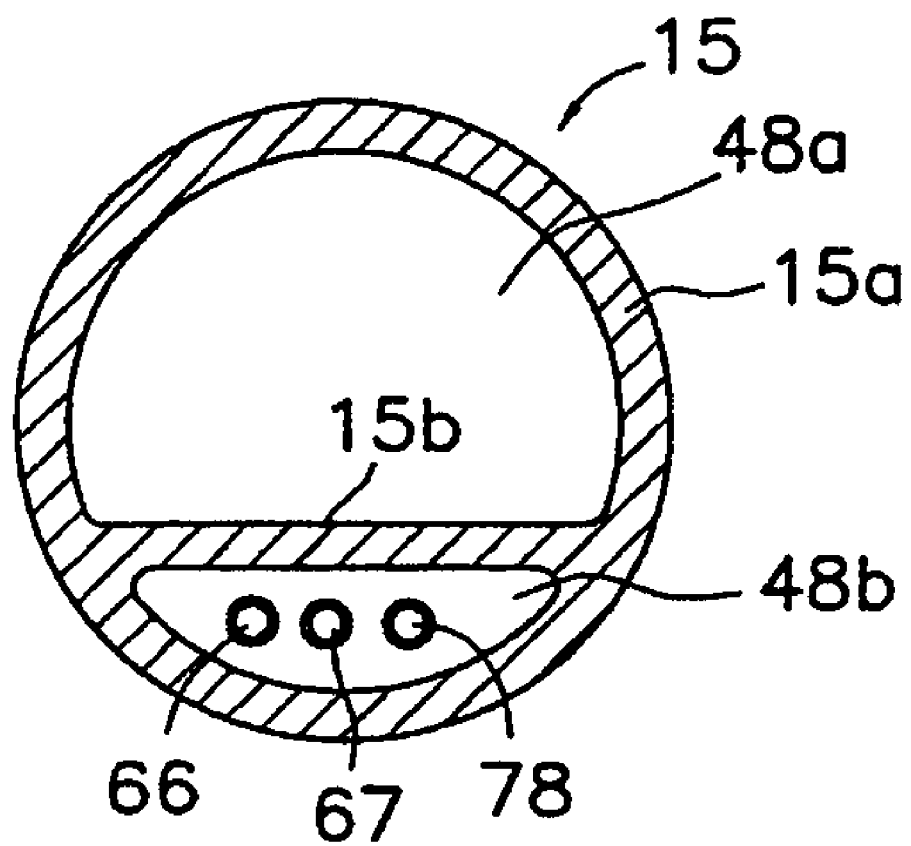
FIG. 4 is a cross sectional view of the handlebar.

FIG. 4 is a cross sectional view of handlebar 15. As shown in FIG. 4, handlebar 15 comprises a tubular handlebar body 15a with a generally circular cross section. A horizontal partition 15b extends along a longitudinal axis X3 (FIG. 3) of handlebar 15 so that the total space in handlebar body 15a is divided onto chambers 48a and 48b. In this embodiment, chamber 48a is empty, and connecting cords 66, 67 and 78 extend along and are housed by chamber 48b.

Figure 5:
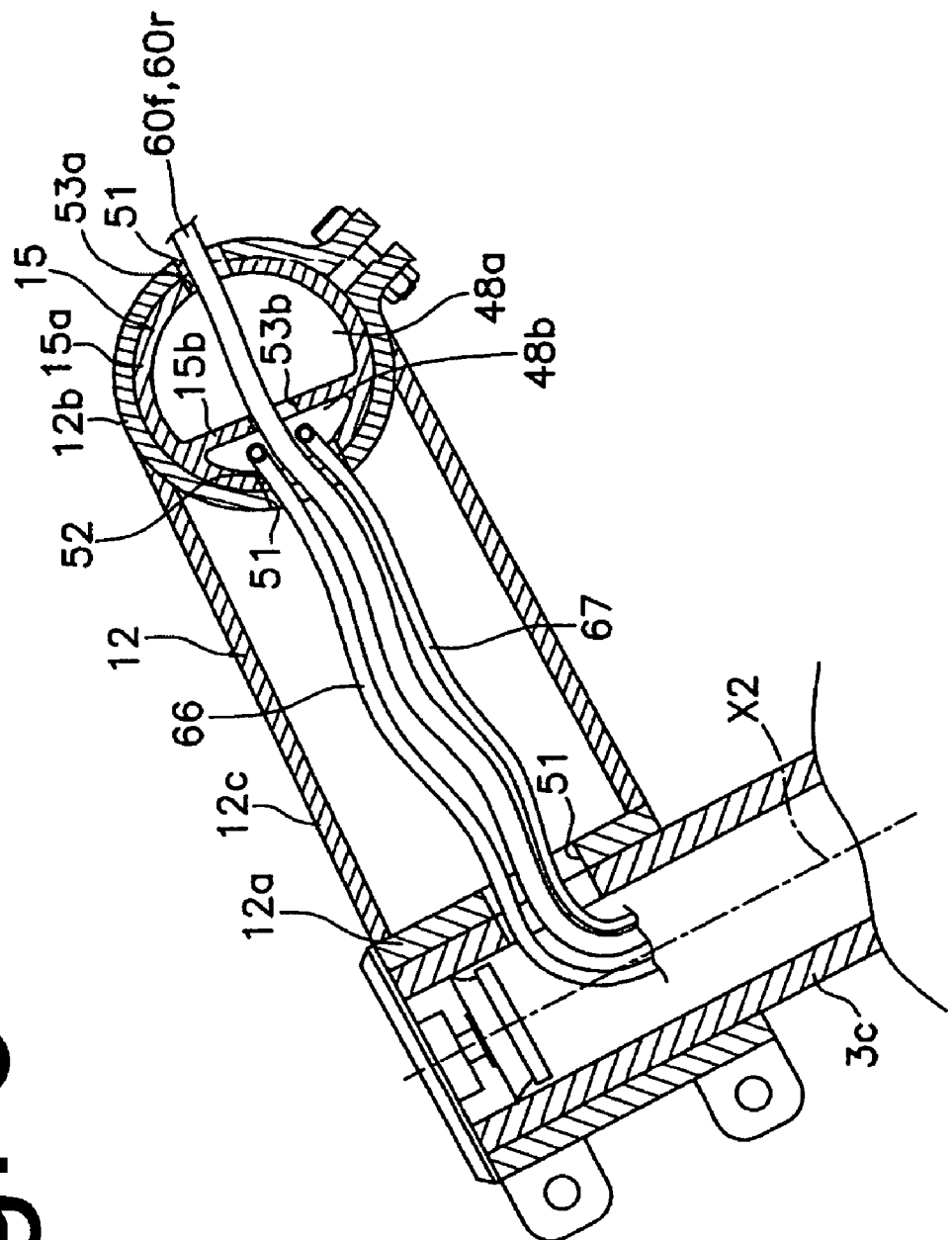
FIG. 5 is a cross sectional view of the handlebar stem attached to the handlebar and front fork.

FIG. 5 is a cross sectional view of handle stem 12 attached to handlebar 15 and to rotating support 3c of front fork 3. As shown in FIG. 5, wire insertion openings 51 are formed in rotating support 3c in front fork 3, in fork fixing component 12a, and at opposite front and rear sides of handlebar mounting component 12c; a wire insertion opening 52 is formed in handlebar body 15a facing rearwardly so as to register with wire insertion opening 51 at the rear of handlebar mounting component 12b, a wire insertion opening 53a is formed in handlebar body 15a facing forwardly so as to register with wire insertion opening 51 at the front of handlebar mounting component 12b, and a wire insertion opening 53b is formed in partition 15b. As a result of these wire insertion openings, brake cable assemblies 60f and 60r may diametrically cross through handlebar body 15a, partition 15b and handlebar mounting component 12b, connecting cords 66 and 67 may be inserted into and withdrawn from chamber 48b through handlebar body 15a and the rear portion of handlebar mounting component 12b, and all of these wiring components may pass through stem 12c and be inserted into and withdrawn from rotating support 3c in front fork 3 through fork fixing component 12a and the side wall of rotating support 3c.

As noted previously, front and rear brake levers 16f and 16r are coupled through the front and rear brake cable assemblies 60f and 60r to the front and rear disc brake devices 13f and 13r. Brake cable assembly 60f runs from the handle stem 12 through the front fork 3a to the front disc brake device 13f. Rear brake cable assembly 60r runs through handle stem 12 and front fork 3a, through chamber 47c in main fame 24, through chamber 47f in swing arm 25, and to rear disc brake device 13r.

Connecting cords 65 and 69 extend through chamber 47e in swing arm 25 to AC generator 19 and rear derailleur 28. Connecting cord 66 extends through chamber 47b in main frame 24 to second control unit 31. Cords 77 and 78 extend from shifting switch 20 and operating switch 21a through chamber 48b in handle bar 15 to terminals 76c and 76d at second control unit 31.

In main frame 24 and swing arm 25, brake cable 60r extends through chambers 47c and 47f and are separated from the electrical wiring in chambers 47b and 47e. This ensures that the electrical wiring will not be damaged by brake cable 60r.

Substantially closed chambers divided by partitions are provided in the handle bar 15, frame body 2, and so on, and wiring components such as connecting cords or brake cables may be inserted into the chambers so as to preserve the strength of the components without requiring increased cross sectional area. This is possible in part because of the partition walls. In other words, the strength of the structural part is preserved without a corresponding increase in weight.

Covering the openings with covers along the full length of the wiring as in the prior art is unattractive. The elasticity of prior art covers also results in their separation from the wiring housing, thus leading to the danger of exposure along the entire length of the wiring that is housed. However, the present embodiment features only wire insertion components with openings just for the insertion and removal of wiring. The end result is therefore not unattractive, with no danger of exposed wiring.

Figure 10:
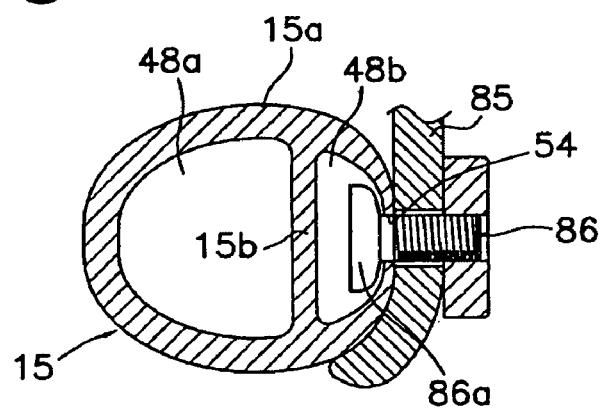
FIG. 10 is a cross sectional view of another embodiment of a handlebar.

While the above is a description of various embodiments of inventive features, further modifications may be employed without departing from the spirit and scope of the present invention. For example, as shown in FIGS. 10 and 11, a part mounting component 54 may be provided on any structural member such as handlebar 15. Such a part mounting component may include an opening through the surface of handlebar main body 15a into chamber 48b so as to provide a mount to other parts 85 such as a bicycle bell. In this embodiment, part mounting component 54 has expanded rounded end portions 54a connected together by an intermediate portion 54b that has the shape of a narrow groove. The other part 85 may be attached to handlebar 15 by inserting the head 86a of a bolt 86, for example, through either one of the two end portions 54a into chamber 48b, sliding the bolt 86 into the intermediate portion 54b, and fastening with a nut. If desired, a rotation stopper (e.g., a pair of flats) may be formed on bolt 86 for engaging the intermediate portion 54b of the part mounting component 54 and preventing bolt 86 from rotating.

As shown in FIG. 12, the opening of the wire insertion component 52 or part mounting component 54 may be closed off by a lid member 88. Lid member 88 thus prevents liquids from entering the corresponding chamber and corroding any wiring component within the chamber.

No partitions were provided in the handle stem 12 or front fork 3 in the disclosed embodiment. However, partitions can be formed to form chambers in them, if desired.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle part comprising:
a tubular bicycle member elongated in a first direction and having a partition forming interior partitioned first and second chambers that are elongated in the first direction;
wherein the bicycle member does not form a slot extending along the entire length of the first and second chambers that exposes the first and second chambers;
wherein the bicycle member includes a first insertion opening formed on an outer peripheral surface of the bicycle member for inserting an elongated member into the first chamber; and
wherein the bicycle member has a cylindrical shape.

2. The bicycle part according to claim 1 wherein the bicycle part is one-piece.

3. A bicycle part comprising:
a tubular bicycle member elongated in a first direction and having a partition forming interior partitioned first and second chambers that are elongated in the first direction;
wherein the bicycle member does not form a slot extending along the entire length of the first and second chambers that exposes the first and second chambers;
wherein the bicycle member includes a first insertion opening formed on an outer peripheral surface of the bicycle member for inserting an elongated member into the first chamber; and
wherein the bicycle member has a circular outer peripheral surface.

4. The bicycle part according to claim 1 wherein the first and second chambers extend along an entire length of the bicycle member in the first direction.

5. The bicycle part according to claim 1 wherein the bicycle member further comprises a part mounting component structured to mount a separate part to the bicycle member.

6. The bicycle part according to claim 5 wherein the first insertion opening is disposed in close proximity to the part mounting component.

7. The bicycle part according to claim 1 wherein the bicycle member comprises a part of a bicycle frame.

8. The bicycle part according to claim 7 wherein the bicycle member comprises a bicycle frame body.

9. A bicycle part comprising:
a tubular bicycle member elongated in a first direction and having a partition forming an interior partitioned chamber that is elongated in the first direction;
wherein the bicycle member does not form a slot extending along the entire length of the partitioned chamber that exposes the partitioned chamber; and
wherein the bicycle member includes an insertion opening formed on an outer peripheral surface of the bicycle member for inserting an elongated member into the partitioned chamber;
wherein the bicycle member comprises a bicycle handlebar.

10. A bicycle part comprising:
a tubular bicycle member elongated in a first direction and having a partition forming an interior partitioned chamber that is elongated in the first direction;
wherein the bicycle member does not form a slot extending along the entire length of the partitioned chamber that exposes the partitioned chamber; and
wherein the bicycle member includes an insertion opening formed on an outer peripheral surface of the bicycle member for inserting an elongated member into the partitioned chamber;
wherein the bicycle member comprises a bicycle handlebar stem.

11. The bicycle part according to claim 1 further comprising a lid member structured to close the first insertion opening.

12. A bicycle part comprising:
a tubular bicycle member elongated in a first direction and having a partition forming interior partitioned first and second chambers that are elongated in the first direction;
wherein the bicycle member does not form a slot extending along the entire length of the first and second chambers that exposes the first and second chambers;
wherein the bicycle member includes a first insertion opening formed on an outer peripheral surface of the bicycle member for inserting an elongated member into the first chamber; and
wherein a cross sectional area of the first chamber is less than a cross sectional area of the second chamber.

13. The bicycle part according to claim 1 further comprising a second insertion opening for inserting an elongated member into the second chamber.

14. The bicycle part according to claim 13 wherein the second insertion opening is formed on an outer peripheral surface of the bicycle member.

15. The bicycle part according to claim 1 wherein the partition forms an interior partitioned third chamber that is elongated in the first direction.

16. The bicycle part according to claim 15 further comprising a second insertion opening for inserting an elongated member into the second chamber.

17. The bicycle part according to claim 16 wherein a cross sectional area of the first chamber is less than a cross sectional area of the third chamber.

18. The bicycle part according to claim 17 wherein a cross sectional area of the second chamber is less than a cross sectional area of the third chamber.

* * * * *